United States Patent Office  3,773,931
Patented Nov. 20, 1973

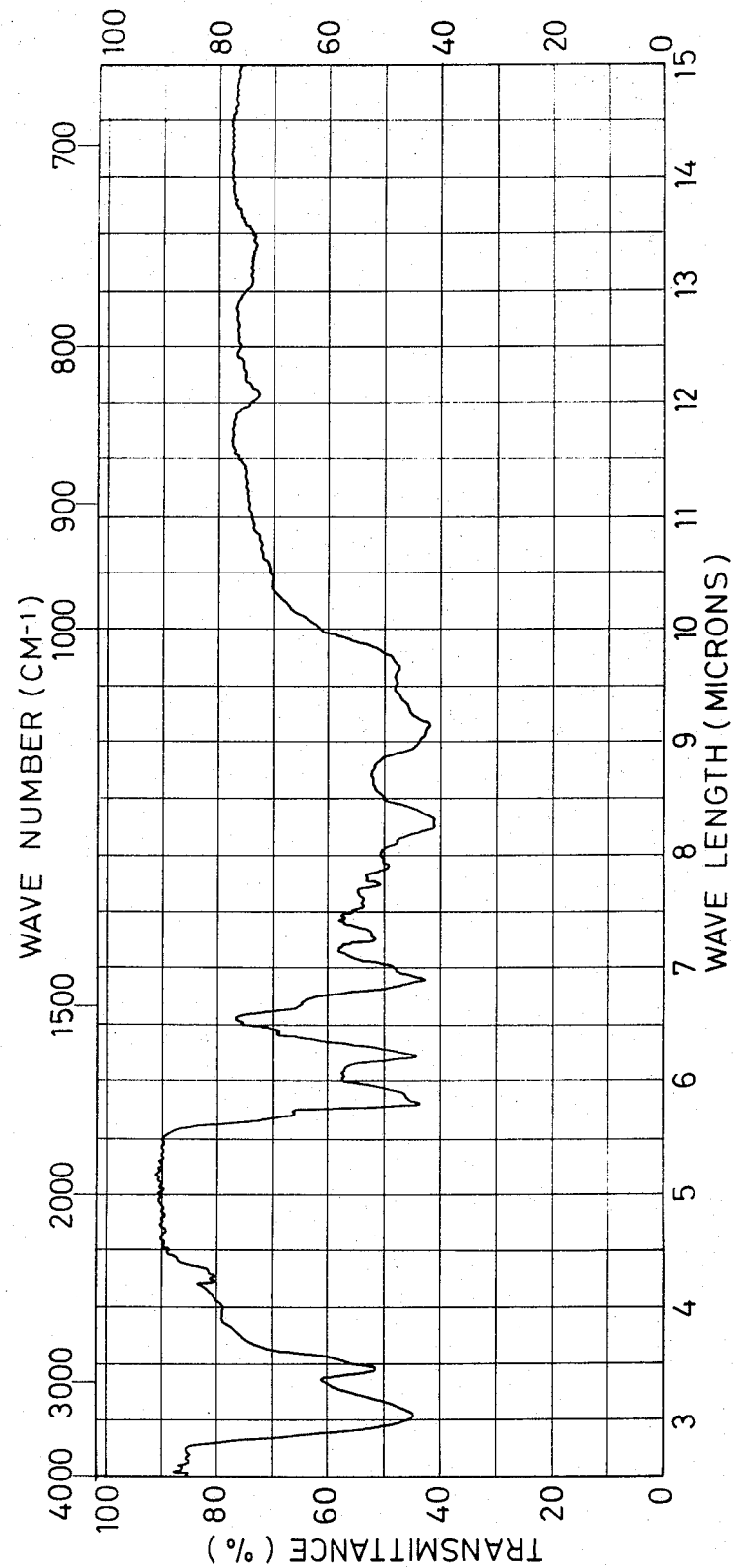

3,773,931
**PHARMACOLOGICALLY EFFECTIVE SUBSTANCE ISOLATED FROM *CABUCALA MADAGASCARIENSIS***
Alfred Groebel, Bad Soden, Taunus, and Ernst Lindner, Frankfurt am Main, Germany, assignors to Farbwerke Hoechst Aktiengesellschaft vormals Meister Lucius & Bruning, Frankfurt am Main, Germany
Filed Feb. 22, 1972, Ser. No. 227,919
Claims priority, application Germany, Feb. 22, 1971, P 21 08 366.9
Int. Cl. A61k 27/00
U.S. Cl. 424—195     3 Claims

ABSTRACT OF THE DISCLOSURE

A pharmacologically active substance and physiologically tolerable salts thereof having hypotensive properties. Said agent, which is isolated from *Cabucala madagascariensis*, melts at 87° C., corresponds to the molecular formula $C_{38}H_{56}O_{12}N_3Cl$, has a molecular weight between 780 and 800 as determined by mass spectroscopy, shows no absorption in its ultraviolet spectrum between 210 and 40 m$\mu$, and has a specific rotation $[\alpha]_{20}^D$ in water of $-20°$.

Method of isolating said substance from *Cabucala madagascariensis*.

---

The present invention relates to a pharmacologically effective substance isolated from *Cabucala madagascariensis*, and to physiologically tolerable salts of said substance.

*Cabucala madagascariensis* is a shrub belonging to the Apocynacea family which is found in the dry regions of the western coast of Madagascar (cf. M. Pichon, "Notulae Systematicae," XIII (1948), pp. 202–203).

It is already known that *Cabucala madagascariensis* contains a crystalline pharmacologically active substance having hypotensive properties. According to Belgian patent specification No. 710,860 (cf. corresponding U.S. Pat. 3,565,990), this substance is obtained by extracting dried material of this plant, preferably stems, with a lower alcohol, if desired after a previous extraction for eliminating fats, waxes, sterols by extracting the dry residue of the alcoholic extract with diluted acids; adjusting the acid solution to the alkaline range; extracting the precipitate subsequently with ether or a halogenated hydrocarbon, for example chloroform, and a lower alcohol; and by chromatographing the residue of the alcoholic solution. By elution with neutral eluants, for example with chloroform/acetone and benzene/acetone, the pure active substance is obtained.

It has already been proposed (Belgian patent specification 764,007) to chromatograph the halogenated hydrocarbon extract of the product obtained by the alkaline precipitation and to isolate a further pharmacologically effective substance with an alkaline, alcoholic eluant.

Now, another pharmacologically effective substance has been obtained from *Cabucala madagascariensis*, which substance has a high hypotensive effect. The present invention relates to a process for isolating a pharmacologically effective substance from *Cabucala madagascariensis* by extracting dried *Cabucala madagascariensis* with an aliphatic halogenated hydrocarbon having 1 to 3 carbon atoms and up to 3 halogen atoms, preferably chlorine atoms, extracting the solution obtained with water, washing the aqueous solution with a low-molecular-weight carboxylic acid ester and drying the aqueous extract.

It is suitable to use from the dried *Cabucala madagascariensis* preferably branches, stems and roots and to submit these to a previous extraction in order to eliminate the main part of the plant fats, waxes and sterols present. There are advantageously used hydrocarbons having 5 to 7 carbon atoms, preferably petroleum ether, pentane or hexane in the ratio of 1:2 to 1:5 parts by weight of drug to solvent.

For extracting the active substance from *Cabucala madagascariensis* aliphatic halogenated hydrocarbons having 1 to 3 carbon atoms and up to 3 halogen atoms, preferably up to 3 chlorine atoms, are used. From these extracting agents trichloro-ethylene and trichloro-ethane, especially methylene chloride and chloroform, are preferred. The extracting agents are preferably used in the ratio of 1:2 to 1:6 parts by weight of drug to extracting agent.

It is suitable to concentrate the halogenated hydrocarbon extract before extracting it with water. Extraction with water is repeated several times in order to remove all water-soluble portions from the halogenated hydrocarbon solution.

The combined aqueous extracts are then washed with the ester of a low-molecular weight carboxylic acid such as formic acid methyl ester, formic acid ethyl ester, acetic acid methyl ester, or acetic acid n-butyl ester, preferably with acetic acid ethyl ester, in order to eliminate undesired accompanying substances.

The washed aqueous extract is then dried, preferably by freeze drying. In this way the active substance is obtained in form of a brownish yellow powder. This active substance is also a subject of the present invention.

The active substance is homogeneous with regard to paper chromatography and shows an $R_f$ value of 0.89 in the system of n-butanol (2), dimethyl formamide (1), water (1) (parts by volume). The spot shows the following reactions: Dragendorff reagent, orange; potassium hexa-iodo-platinate, violet blue; iron-III-chloride, dark blue; antimonium-III-chloride, pale blue; ninhydrin dark carmine red.

The active substance is difficult to crystallize and melts at 87° C. It forms a crystallized picrate which melts at 235–240° C. with decomposition. Elemental analysis: C, 57.7%; H, 7.0%; N, 4.9%; O, 24.4%; Cl, 5.2%.

From the mass spectrum, a molecular weight between 780 and 800 was determined. The ultraviolet spectrum shows no absorption in the range between 210 and 400 m$\mu$. The specific rotation $[\alpha]_{20}^D$ is 20° in water. The infrared spectrum is shown in the accompanying drawing.

The active substance is soluble especially in water, but also in other polar solvents such as pyridine, dimethyl formamide, and dimethyl sulfoxide, as well as in ethanol, in acids, and in methylene chloride. The active substance according to the invention may be converted into physiologically tolerable salts by adding equivalent amounts of inorganic or organic acids, such as hydrochloric acid, phosphoric acid, acetic acid, lactic acid, and tartaric acid.

The new active substance according to the invention is characterized by a very good hypotensive effect. Peripherally, there is a vasodilatation; centrally a decrease of pulse rate. The heart frequency is usually decreased.

Tests with dogs having an increased blood pressure have shown the following results: After an intravenous injection of 0.25 mg. of active substance per kg. of body-weight, a blood pressure of 125/85 mm. of Hg decreases to 105/65 mm. of Hg within 20 minutes. It is not yet stabilized after one hour. Simultaneously the pulse rate decreases in the course of 50 minutes from 189 to 167 beats per minute. Furthermore, the left ventricular pressure, which has been at first increased to reach 2600 mm. Hg, is gradually reduced to 1900 mm. of Hg per second after 50 minutes. The breathing frequency is not influenced.

When infusing intravenously to dogs 2 mg. of active substance per kg. of body-weight in 5 ml. of an aqueous solution within 10 minutes, the blood pressure is decreased from 170/140 to 135/110 mm., which is only balanced after 185 minutes. Within 10 minutes, the pulse rate is decreased from 179 to 158 beats per minute. It is stabilized after 185 minutes. The rate of increase of the left ventricular pressure is reduced from 5200 to 3200 mm. of Hg per second and is 4400 mm. of Hg per second after 185 minutes. The coronary sinus flow is increased within 2 minutes from 134 to 146 ml. per minute and is stabilized after 20 minutes. The leg flow is increased after 10 minutes from 16 to 41 ml. per minute and is stabilized after 30 minutes.

The active substance also shows its hypotensive effect in rats which show an increased blood pressure after an operative contriction of both renal arteries. When a daily dose of 10 mg. per kg. of body-weight is administered subcutaneously over a period of three days, the blood pressure is decreased from 168 to 122 mm. of Hg and is maintained for another three days at this value. The toxicity in the white mouse amounts to 12–15 mg. of active substance per kg. of body-weight.

Due to its hypotensive action, the new active substance and physiologically tolerable salts thereof are suitable for treating cardiac and circulatory diseases, for example in the case of chronic hypertension, cardiac insufficiency, angina pectoris and disturbed peripheral circulation.

The active substance may be administered by orally or intravenously. Depending on the degree of illness and on the weight of the patient, the daily dosage may range between 1 and 50 mg.

For oral administration, there are considered especially tablets or dragées, which contain the active substance or salts thereof in an amount of from 1 to 50 mg. as well as the usual auxiliaries and carriers such as talcum, starch, lactose, etc. For intravenous application, aqueous solutions of the active substance or salts thereof are preferably used.

The following examples illustrate the extraction of the new active substance from *Cabucala madagascariensis*. The possibilities of extraction, however, are not limited to these examples.

The following examples illustrate invention.

EXAMPLE 1

7.4 kg. ground branches and stems of *Cabucala madagascariensis* were freed from plant fats, waxes and sterols with 30 liters of petroleum ether in a Soxhlet extractor. Then the branches and stems were extracted completely in the same extractor with 60 liters of chloroform. The violet brown chloroform solution was filtered and concentrated to 500 ml. under reduced pressure. The concentrated solution was extracted three times with 200 ml. portions of water. After separating the aqueous layers from the chloroform layer, the combined aqueous extracts were washed three times with 100 ml. portions of acetic acid ethyl ester. The washed aqueous extract was then submitted to freeze drying. With regard to paper chromatography, a homogeneous, yellow-brown powder was obtained in a yield of 9.6 g., which powder had the properties indicated earlier herein.

EXAMPLE 2

8.3 g. of ground root of *Cabucala madagascariensis* were ungreased as described in Example 1 and then extracted completely with 60 liters of methylene chloride. The reddish brown methylene chloride solution thus obtained was concentrated to 1 liter and extracted three times with 500 ml. portions of water. After separating the aqueous layers from the methylene chloride solution, the combined aqueous extracts were extracted three times with 200 ml. portions of acetic acid ethyl ester. The aqueous extract thus obtained was then submitted to freeze drying. 35.2 g. of the active substance were obtained, which substance had the properties indicated earlier herein.

What is claimed is:

1. A pharmacologically active substance isolated from *Cabucala madagascariensis*, and physiologically tolerable salts of said substance, said substance having a melting point of 87° C.; having the molecular formula $$C_{38}H_{56}O_{12}N_3Cl$$

having a molecular weight between 780 and 800 as determined by mass spectrography; having an ultraviolet spectrum showing no absorption between 210 and 400 m$\mu$; having a specific rotation $[\alpha]_D^{20}$, in water, of $-20°$; and having an infrared spectrum as shown in the accompanying drawing.

2. A pharmaceutical dosage unit form comprising the pharmacologically active substance of claim 1, or a physiologically tolerable salt thereof, in an amount of 1 to 50 mg., and a pharmaceutically acceptable carrier.

3. A method for lowering the blood pressure which comprises administering 1 to 50 mg., per dosage unit, of the pharmacologically active substance of claim 1 or a physiologically tolerable salt thereof.

References Cited

UNITED STATES PATENTS 3,565,990   2/1971   Groebel _____ 424—195

JEROME D. GOLDBERG, Primary Examiner